(12) United States Patent
McConnell et al.

(10) Patent No.: US 8,561,640 B2
(45) Date of Patent: Oct. 22, 2013

(54) LATCHING CHECK VALVE

(75) Inventors: Trevor McConnell, Rittman, OH (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 414 days.

(21) Appl. No.: 12/939,619

(22) Filed: Nov. 4, 2010

(65) Prior Publication Data

US 2011/0108140 A1    May 12, 2011

Related U.S. Application Data

(60) Provisional application No. 61/260,594, filed on Nov. 12, 2009.

(51) Int. Cl.
*F16K 21/14* (2006.01)

(52) U.S. Cl.
USPC .............. 137/523; 137/543.19; 137/624.27; 251/73; 251/230

(58) Field of Classification Search
USPC .............. 137/522, 523, 543.19, 467, 624.27; 251/73, 82, 83, 230
See application file for complete search history.

(56) References Cited

U.S. PATENT DOCUMENTS

| | | | | |
|---|---|---|---|---|
| 1,736,749 A | * | 11/1929 | Penn | 137/112 |
| 3,114,391 A | * | 12/1963 | Kurtz | 137/599.18 |
| 3,623,509 A | * | 11/1971 | Sesseler et al. | 137/630.15 |
| 3,747,620 A | * | 7/1973 | Kah, Jr. | 137/119.03 |
| 4,067,358 A | * | 1/1978 | Streich | 137/624.13 |
| 4,221,238 A | * | 9/1980 | Madsen | 137/627.5 |
| 4,383,234 A | | 5/1983 | Yatsushiro et al. | |
| 4,624,445 A | * | 11/1986 | Putnam | 251/63.4 |
| 5,682,792 A | | 11/1997 | Liesener et al. | |
| 5,758,863 A | | 6/1998 | Buffet et al. | |
| 5,954,162 A | | 9/1999 | Feigel et al. | |
| 6,073,904 A | | 6/2000 | Diller et al. | |
| 6,129,115 A | | 10/2000 | Janssen et al. | |
| 6,390,947 B1 | | 5/2002 | Aoki et al. | |
| 2007/0181188 A1 | * | 8/2007 | Branch et al. | 137/494 |
| 2008/0314711 A1 | | 12/2008 | Jayaram et al. | |
| 2009/0032749 A1 | * | 2/2009 | Ishihara | 251/73 |

FOREIGN PATENT DOCUMENTS

JP    2007-234501    *    3/2007

OTHER PUBLICATIONS

Machine Translation of DE 3541249 C, Jul. 1987, Bolt et al., Germany.*

* cited by examiner

*Primary Examiner* — Craig Schneider
*Assistant Examiner* — Time Aigbe
(74) *Attorney, Agent, or Firm* — Simpson & Simpson, PLLC

(57) ABSTRACT

A hydraulic valve including an inlet port for receiving a pressurized hydraulic fluid and an outlet port for expelling the hydraulic fluid. The valve also includes a displaceable spool for blocking and unblocking a flow path between the inlet and outlet ports, and a latching mechanism for displacing the spool in response to a pressure surge for the hydraulic fluid. The valve includes a first elastic element and a second elastic element, where the first elastic element urges the spool into a position blocking the flow path and the second elastic element urges the latching mechanism to displace the spool into a position out of the flow path. In an unlatched position of the latching mechanism, force from the second elastic element is transferred to the spool, and in a latched position of the latching mechanism, the spool is isolated from the second elastic element.

13 Claims, 3 Drawing Sheets

LATCHING CHECK VALVE

CROSS-REFERENCE TO RELATED APPLICATIONS

This application claims the benefit under 35 U.S.C. §119 (e) of U.S. Provisional Application No. 61/260,594, filed Nov. 12, 2009.

FIELD OF THE INVENTION

The invention relates generally to a hydraulic valve, and more specifically to a latching check valve adjusted by hydraulic pressure.

BACKGROUND OF THE INVENTION

U.S. Pat. No. 6,073,904 by Diller et al. describes a valve with a solenoid and a pilot valve and teaches energizing the coil of the solenoid moves a plunger to open and close the valve. U.S. Pat. No. 6,073,904 also teaches a latching mechanism with a permanent magnet to latch the valve in an open position and a coil spring to latch the valve in a closed position.

BRIEF SUMMARY OF THE INVENTION

Example aspects of the present invention broadly comprise a hydraulic valve including an inlet port for receiving a pressurized hydraulic fluid and an outlet port for expelling the hydraulic fluid. The valve also includes a displaceable spool element for blocking and unblocking a flow path between the inlet and outlet ports, and a latching mechanism for displacing the spool element in response to a pressure surge for the hydraulic fluid. In some example embodiments of the invention, the valve includes a first elastic element and a second elastic element. The first elastic element urges the spool element into a position blocking the flow path and the second elastic element urges the latching mechanism to displace the spool element into a position out of the flow path. In an unlatched position of the latching mechanism, force from the second elastic element is transferred to the spool element, and in a latched position of the latching mechanism, the spool element is isolated from the second elastic element.

In some example embodiments of the invention, the latching mechanism includes a tooth ring, a retainer disposed proximate the second elastic element and with a toothed portion for rotational engagement with the tooth ring, and a plunger disposed proximate the spool element and with a toothed portion for rotational engagement with the tooth ring. The retainer and plunger are in mating engagement. In an example embodiment of the invention, the retainer comprises a blocking portion, and the retainer and plunger comprise complementary ramps in mating engagement. The pressure surge is for displacing the retainer toothed portion axially beyond the tooth ring, force from the second elastic element and the pressure surge act on the complementary ramps to rotate the retainer, and the blocking portion engages the tooth ring after the rotation.

In an example embodiment of the invention, the hydraulic valve includes a housing and the plunger is hydraulically sealed to the housing. In another example embodiment of the invention the hydraulic valve includes a first housing and a second housing. The spool element is disposed in and hydraulically sealed to the second housing, and the second housing is disposed in and hydraulically sealed to the first housing. Some example embodiments of the invention include a plug. The second housing is fixedly attached to the plug and the plug is sealed to the first housing. In an example embodiment of the invention, the hydraulic valve includes an elastic element axially disposed between the spool element and the plug. The spool element has an angled surface and the second housing has a ledge, and the elastic element urges the angled surface into sealing contact with the ledge.

Other example aspects of the invention broadly comprise a hydraulic valve include a first housing with at least two flow ports, a spool element disposed within the first housing and urged in a first direction by a first elastic element, and a latching mechanism disposed within the first housing and urged in a second direction, opposite the first direction, by a second elastic element. For fluid pressure at a first level, the spool element is displaceable in the second direction to enable flow between the flow ports. For fluid pressure at a second level, higher than the first level, the latching mechanism is displaceable in the first direction to latch or unlatch the latching mechanism.

In some embodiments of the invention, in an unlatched position of the latching mechanism, force from the second elastic element is transferred to the spool element to enable flow between the flow ports, and in a latched position of the latching mechanism, the spool element is isolated from the second elastic element. In some example embodiments of the invention, the latching mechanism includes a tooth ring fixed to the first housing, a retainer disposed proximate the second elastic element, and a plunger disposed proximate the spool element. The retainer and plunger are in mating engagement and each include a toothed portion for rotational engagement with the tooth ring.

In an example embodiment of the invention, the retainer includes a blocking portion and the retainer and plunger comprise complementary ramps in mating engagement. The second level fluid pressure displaces the retainer toothed portion axially beyond the tooth ring, forces from the second elastic element and the fluid pressure acting on the complementary ramps rotate the retainer, and the blocking portion engages the tooth ring after the rotation. In an example embodiment of the invention, the plunger is hydraulically sealed to the first housing.

In some example embodiments of the invention, the hydraulic valve includes a second housing, the spool element is disposed in and hydraulically sealed to the second housing, and the second housing is disposed in and hydraulically sealed to the first housing. The hydraulic valve may include a plug. The second housing is fixedly attached to the plug and the plug is sealed to the first housing. In an example embodiment of the invention, the hydraulic valve includes a first elastic element axially disposed between the spool element and the plug. The spool element has an angled surface and the second housing has a ledge, and the first elastic element urges the angled surface into sealing contact with the ledge.

Other example aspects of the invention broadly comprise a hydraulic valve including an inlet port for receiving a pressurized supply of hydraulic fluid, an outlet port for expelling the hydraulic fluid, a check valve assembly for controlling fluid flow between the inlet port and the outlet port, and a latching mechanism controlled by a pressure level of the pressured supply of hydraulic fluid. The latching mechanism is arranged to displace the check valve assembly. In an example embodiment of the invention, the check valve assembly includes a spool element and adjusting the check valve assembly includes displacing the spool element to enable bidirectional flow between the inlet and outlet port. In an example embodiment of the invention, the spool element is urged in a first direction by a first elastic element and the latching mechanism is urged in a second direction, opposite the first direction, by a second elastic element.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
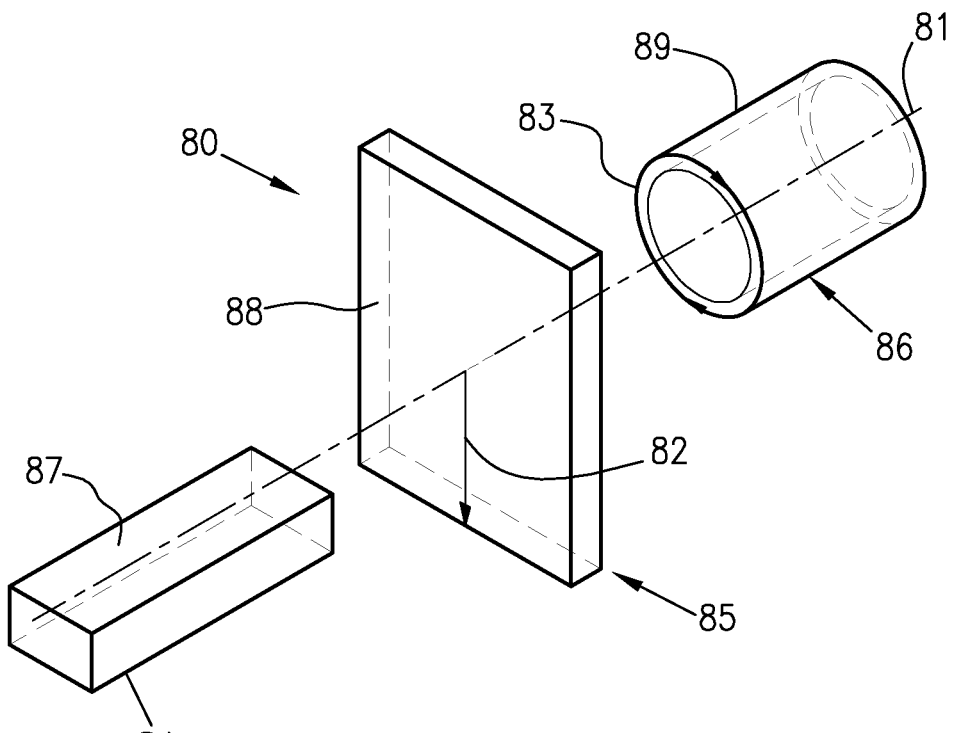
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
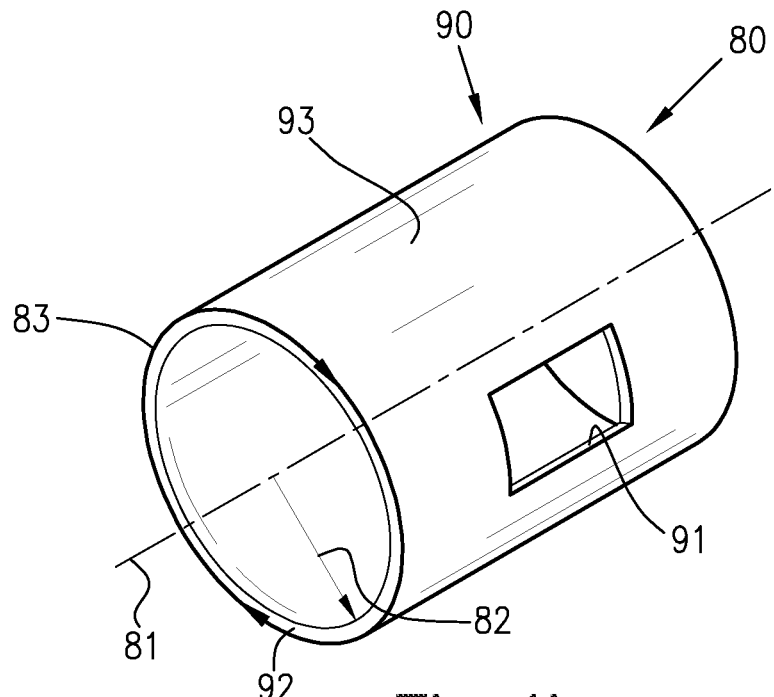
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
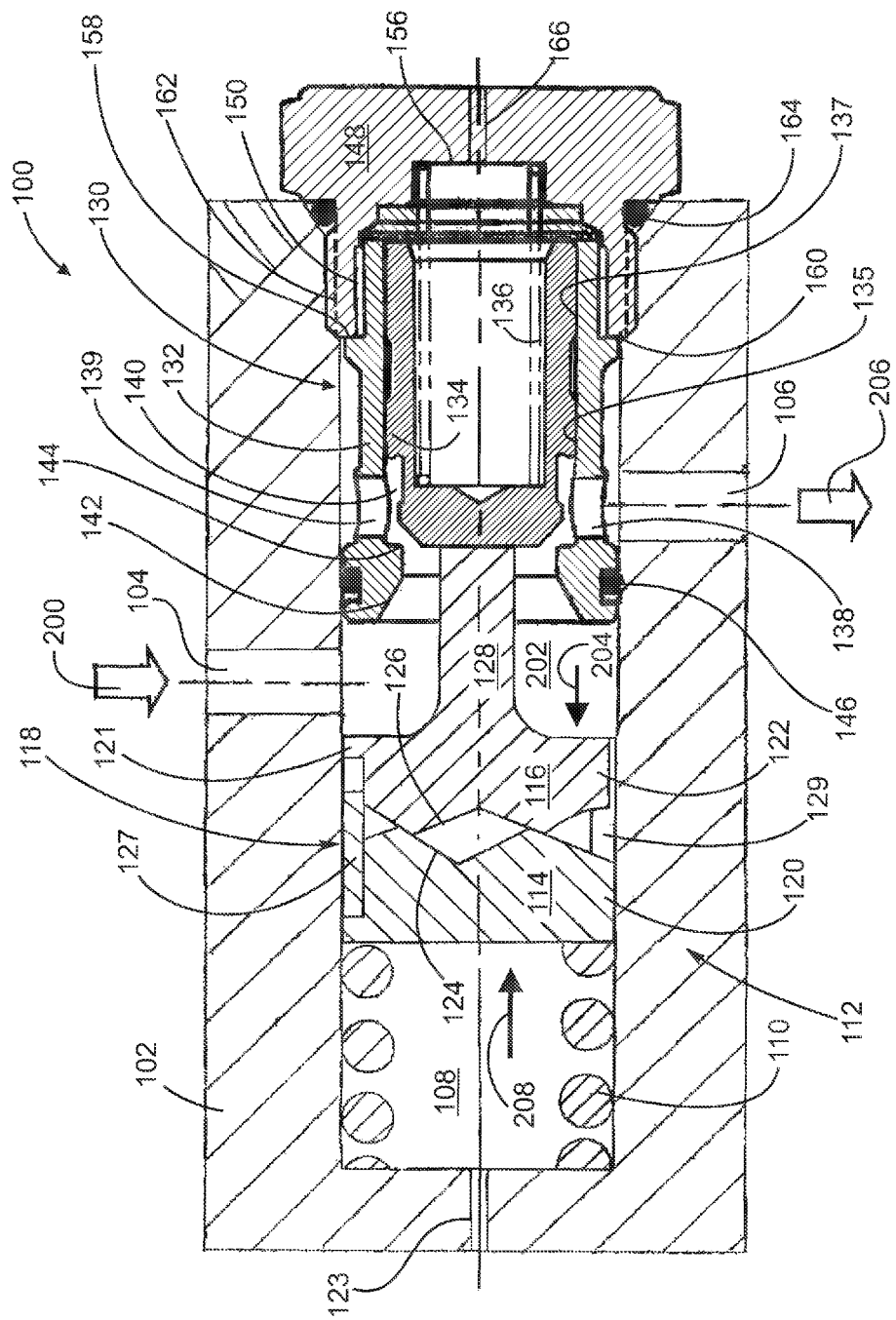
FIG. 2 is a cross-sectional view of an adjustable valve shown in a bypass position, according to an example embodiment of the invention; and, FIG. 3 is a cross-sectional view of an adjustable valve shown in a check-valve position, according to an example embodiment of the invention.
Figure 3:
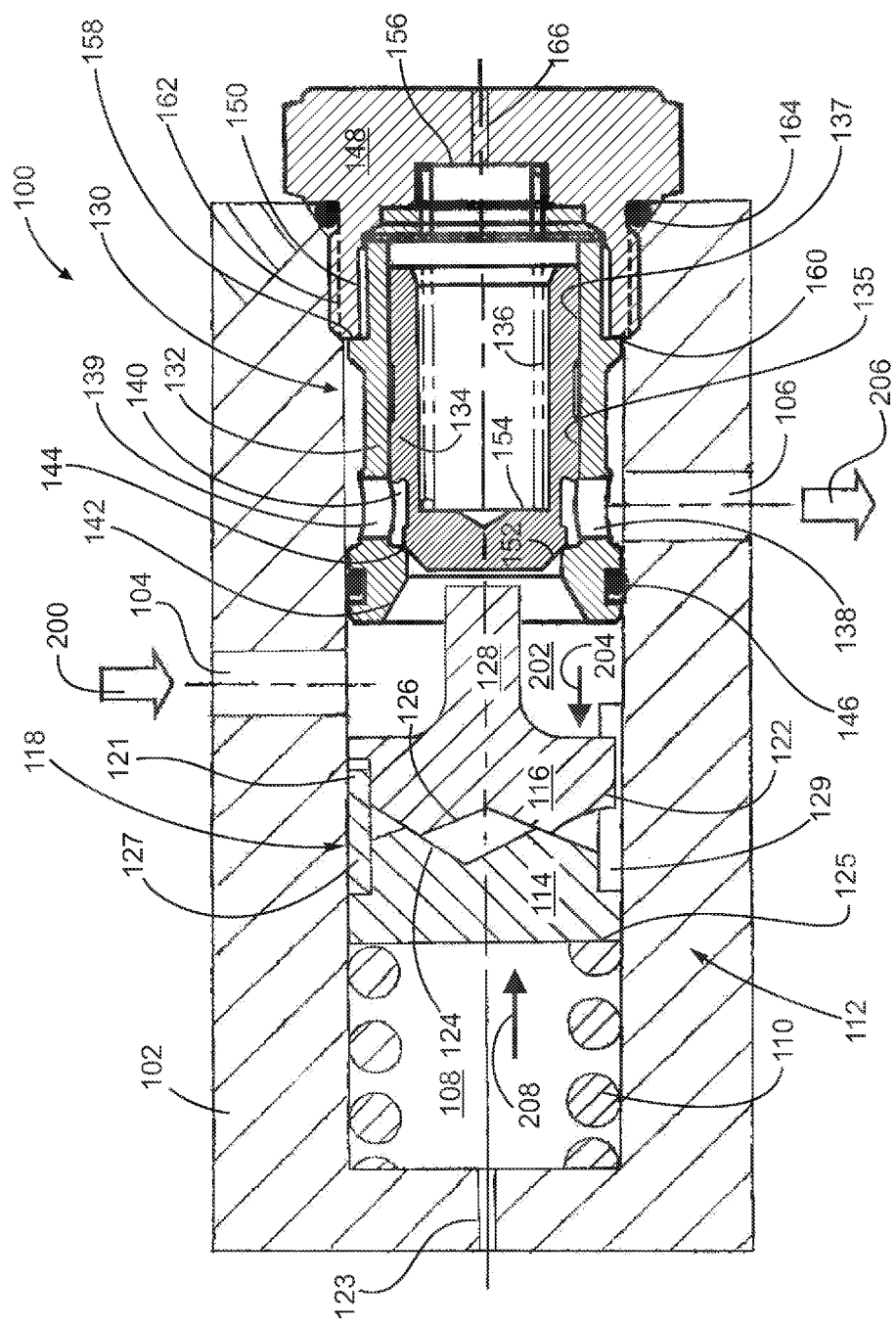

The following description is made with reference to FIGS. 2-3. FIG. 2 is a cross-sectional view of adjustable valve 100 shown in a bypass position, according to an example embodiment of the invention. FIG. 3 is a cross-sectional view of adjustable valve 100 shown in a check-valve position, according to an example embodiment of the invention. Valve 100 includes housing 102 with inlet port 104 and outlet port 106. Housing 102 may be a separate component or incorporated into a valve body of a transmission (not shown), for example. Housing 102 includes axial bore 108 connecting ports 104 and 106.

Elastic member 110 and latching mechanism 112 are disposed in bore 108. Elastic member 110 may be a coil spring, for example. Latching mechanism 112 includes retainer 114, plunger 116, and toothed ring 118. Toothed ring 118 is fixedly attached to bore 108 using any method known in the art. Ring 118 may be fixed to bore 108 by a press-fit connection, for example. In an example embodiment of the invention (not shown), ring 118 is integral to housing 102 and an outer diameter of elastic element 110 is less than an inner diameter of ring 118.

Retainer 114 and plunger 116 include respective toothed portions 120 and 122, engaged with ring 118. In an example embodiment of the invention, plunger 116 further includes sealing portion 121. Portion 121 is a continuous ring (without teeth) arranged to seal plunger 116 to housing 102. In an example embodiment of the invention (not shown), plunger 116 is sealed to housing 102 using any sealing means known in the art. Plunger 116 may be sealed to housing 102 with an o-ring or a lip seal, for example. Housing 102 includes weep hole 123 so that fluid breaching sealing portion 121 is expelled and does not exert pressure against retainer 114.

In an example embodiment of the invention, retainer 114 includes discontinuous blocking ring 125 circumferentially disposed between retainer teeth 120. Blocking ring 125 controls an axial position of retainer 114 when ring 125 is circumferentially aligned with teeth 127 of toothed ring 118. That is, ring 125 abuts ring 118 to restrict axial motion of retainer 114 as shown in FIG. 3. In an example embodiment of the invention (not shown), the blocking ring is a portion of toothed ring 118 and abuts retainer teeth 120. Ring 125 does not restrict axial motion of retainer 114 when blocking ring 125 is not circumferentially aligned with toothed ring 118 (i.e., when ring 125 is circumferentially aligned with gaps 129 in ring 118 as shown in FIG. 2.)

Retainer 114 and plunger 116 further include respective complementary ramps 124 and 126 in mating engagement. Ramps 124 and 126 induce rotational motion to retainer 114 and plunger 116 when an axial force is applied. That is, without any rotational restriction, ramps 124 and 126 work collectively to rotate retainer 114 relative to plunger 116 when an axial force is applied to the components. Ramps 124 and 126 may be flat angled surfaces or helical ramps, for example.

Plunger 116 includes axial extension 128 proximate check valve assembly 130. Check valve assembly 130 includes housing 132, spool 134 and elastic element 136. Elastic element 136 may be a coil spring, for example. Spool 134 includes sealing portions 135 and 137 arranged to seal spool 134 to housing 132. In an example embodiment of the invention (not shown), spool 134 is sealed to housing 132 using any sealing means known in the art. Spool 134 may be sealed to housing 132 with an o-ring or a lip seal, for example.

Housing 132 includes radial port 138 aligned with outlet port 106 and bore 140 with angled inlet 142 and step 144. Housing 132 may also include additional radial ports 139. Housing 132 is sealed to bore 108 of housing 102 by sealing device 146. Sealing device 146 may be an o-ring, for example.

Valve 100 further includes plug 148 for closing off bore 108. Housing 132 is engaged with plug 148 at threaded connection 150. In an example embodiment of the invention (not shown), housing 132 is engaged with plug 148 by a staked, press-fit, and/or welded connection. Contact between step 144 in housing 132 and angled surface 152 of spool 134 compresses elastic element 136 between spool surface 154 and plug surface 156 when housing 132 is installed into plug 148. Housing 132 is inserted into plug 148 until step 158 of housing 132 is seated against end surface 160 of plug 148 to control compression and resulting force exerted by elastic element 136 to spool 134. Therefore, spool 134 is sealed to housing 132 at interface of step 144 and surface 152 until compression force of elastic element 136 is overcome.

Plug 148 is engaged with housing 102 at threaded connection 162. Therefore, all components of valve assembly 100 are contained within housing 102 for easy handling and assembly. Plug 148 is sealed to housing 102 by o-ring 164, for example. Plug 148 includes weep hole 166 so that fluid breaching sealing portions 135 and 137 is expelled and does not exert pressure against spool 134.

The following description will explain the operation of valve 100 in a bypass condition where latching mechanism 112 is unlatched as shown in FIG. 2. Pressurized hydraulic fluid enters valve 100 through inlet port 104 in direction of arrow 200. Upon entering chamber 202, the pressurized fluid exerts an axial force against plunger 116 in direction of arrow 204. The axial force from the pressurized fluid against plunger 116 is resisted by the force of elastic element 110 against retainer 114. The elastic element force acts on plunger 116 through retainer 114 and ramps 124 and 126.

Pressurized fluid also passes through angled inlet 142 into bore 140 and exits valve 100 in direction of arrow 206 through radial port(s) 138 and/or 139 and outlet port 106. Elastic element 110 urges latching mechanism 112 to displace spool 134 into an unblocking position. Alternatively stated, when latching mechanism 112 is in the unlatched position, force is communicated from elastic element 110 to spool element 134. Therefore, the flow of pressurized fluid is not restricted so long as the force on plunger 116 from the pressurized fluid is less than the force exerted on retainer 114 by spring 110. Conversely, if pressure is removed from fluid entering inlet port 104, pressurized fluid in outlet port 106 can pass through valve 100 without restriction to relieve pressure on the outlet side. Thus, bidirectional flow between inlet port 104 and outlet port 106 is enabled.

When the fluid force acting on plunger 116 exceeds the spring force, plunger 116 axially moves in direction of arrow 204. Plunger ramps 126 exert force against retainer ramps 124. While ramps 124 and 126 urge circumferential displacement of retainer 114 and plunger 116, toothed connections of retainer teeth 120 and plunger teeth 122 with toothed ring 118 prevent relative rotation, moving retainer 114 in direction of arrow 204 compressing elastic element 110. Plunger extension 128 moves away from spool 134 allowing elastic element 136 to axially displace spool 134 in direction of arrow 204. Displacement of spool 134 is opposed by a force of the pressurized hydraulic fluid in chamber 202 acting on spool 134 so that fluid flow remains unrestricted.

Latching mechanism 112 is controlled by the pressure level of the fluid. A high pressure pulse or surge introduced through inlet port 104 can be used to displace spool 134 and select or deselect check-valve operation of valve 100. Valve 100 is designed to switch modes when high pressure fluid is introduced through inlet port 104. The pressure of the high pressure fluid is selected to be higher than an operating pressure so that the valve is not accidentally switched during operation. Hydraulic pumps and/or solenoids (not shown) can be used to adjust the pressure in any manner commonly known in the art.

High pressure fluid entering port 104 exerts force on plunger 116 and spool 134 as described supra. In this instance, force on plunger 116 displaces retainer 114 further in direction 204 and teeth 120 move axially beyond teeth of ring 118. Once the rotational restriction of the toothed interface is removed, retainer 114 is rotated by rotational force exerted by interaction of ramps 124 and 126. That is, forces from elastic element 110 and the pressure surge acting at the interface of ramps 124 and 126 rotate retainer 114. Rotational position of retainer 114 is controlled by engagement of mating peaks and valleys of ramps 124 and 126 so that blocking ring 125 is circumferentially aligned with teeth 127. When the high pressure fluid is removed, ring 125 abuts ring 118, preventing axial displacement of retainer 114 in direction of arrow 208. Thus, valve 100 has been placed in the check valve position shown in FIG. 3.

The following description will explain the operation of valve 100 in a check-valve condition where latching mechanism 112 is latched as shown in FIG. 3. Pressurized hydraulic fluid enters valve 100 through inlet port 104 in direction of arrow 200. Upon entering chamber 202, the pressurized fluid exerts an axial force against plunger 116 in direction of arrow 204. The axial force from the pressurized fluid against plunger 116 is resisted by the force of elastic element 110 against retainer 114. The elastic element force acts on plunger 116 through retainer 114 and ramps 124 and 126. However, retainer 114 is latched and force communication between elastic element 110 and spool 134 is blocked because axial motion of retainer 114 is restricted by abutting contract between blocking ring 125 and teeth 127. Alternatively stated, spool 134 is isolated from elastic element 110.

Pressurized fluid also passes through angled inlet 142. Spool 134 is urged into contact with step 144 by elastic element 136, preventing flow into bore 140. Alternatively stated, elastic element 136 urges spool 134 into a blocking position. Therefore, the flow of pressurized fluid is blocked so long as the force on spool 134 from the pressurized fluid is less than the force exerted on spool 134 by elastic element 136.

The restriction is overcome by increasing fluid pressure to displace spool 134 to unblock flow into bore 140. Pressurized fluid in bore 140 exits valve 100 in direction of arrow 206 through radial port(s) 138 and/or 139 and outlet port 106. Therefore, the flow of pressurized fluid is minimally restricted so long as the force on spool 134 from the pressurized fluid is greater than the force exerted on spool 134 by elastic element 136. Conversely, if pressure is removed from fluid entering inlet port 104, pressurized fluid in outlet port 106 and force of elastic element 136 urge spool 134 into contact with ledge 144 preventing fluid from passing through valve 100 maintaining pressure on the outlet side. Valve 100 can be returned to bypass mode using high pressure as described supra.

Valve 100 may be operated to control hydraulic clutch engagement in a vehicle transmission in the following manner. During normal operation, valve 100 is placed in the bypass mode. Therefore, pressurized fluid is free to pass through valve 100 to engage and disengage transmission clutches as usual. It may be desirable, however, to decrease transmission pump pressure for improved fuel economy during long periods when the clutch remains engaged. Decreasing pressure in a typical transmission would allow the clutch to slip. With the addition of valve 100, however, a high pressure pulse places valve 100 into check-valve mode allowing valve 100 to maintain pressure on the clutch (valve outlet) to prevent slip even if the pressure is reduced. Another pulse places valve 100 back into bypass mode to release the clutch and shift the transmission.

Similarly, it may be desirable to turn off a vehicle engine when the vehicle is moving slowly or stopped. Because the transmission pump is typically driven by the engine, the pump also stops pumping pressurized fluid. When the vehicle launches, the transmission clutch would likely slip until the pump builds enough pressure to fully engage the clutch. With the addition of valve 100, however, a high pressure pulse places valve 100 into check-valve mode allowing valve 100 to maintain pressure on the clutch (valve outlet) to prevent slip even if the pump is stopped Once the pump builds sufficient pressure, another pulse places valve 100 back into bypass mode to release the clutch and shift the transmission.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A hydraulic valve comprising:
   an inlet port for receiving a pressurized hydraulic fluid;
   an outlet port for expelling the hydraulic fluid;
   a displaceable spool element for blocking and unblocking a flow path between the inlet and outlet ports;
   a latching mechanism for displacing the spool element in response to a pressure surge from the hydraulic fluid; and,
   a first elastic element and a second elastic element, wherein:
      the first elastic element urges the spool element into a position blocking the flow path and the second elastic element urges the latching mechanism to displace the spool element into a position out of the flow path; and,
   the latching mechanism comprises:
      a tooth ring;
      a retainer disposed proximate the second elastic element and with a toothed portion for rotational engagement with the tooth ring; and,
      a plunger disposed proximate the spool element and with a toothed portion for rotational engagement with the tooth ring, and wherein the retainer and plunger are in mating engagement.

2. The hydraulic valve of claim 1, wherein in an unlatched position of the latching mechanism, force from the second elastic element is transferred to the spool element; and in a latched position of the latching mechanism, the spool element is isolated from the second elastic element.

3. The hydraulic valve of claim 1, wherein:
   the retainer comprises a blocking portion;
   the retainer and plunger comprise complementary ramps in mating engagement;
   the pressure surge is for displacing the retainer toothed portion axially beyond the tooth ring;
   force from the second elastic element and the pressure surge act on the complementary ramps to rotate the retainer; and,
   the blocking portion engages the tooth ring after the rotation.

4. The hydraulic valve of claim 3 further comprising a housing, wherein the plunger is hydraulically sealed to the housing.

5. The hydraulic valve of claim 1 further comprising a first housing and a second housing, wherein the spool element is disposed in and hydraulically sealed to the second housing, and the second housing is disposed in and hydraulically sealed to the first housing.

6. The hydraulic valve of claim 5 further comprising a plug, wherein the second housing is fixedly attached to the plug and the plug is sealed to the first housing.

7. The hydraulic valve of claim 6 further comprising an elastic element axially disposed between the spool element and the plug, wherein the spool element comprises an angled surface and the second housing comprises a ledge, and the elastic element urges the angled surface into sealing contact with the ledge.

8. A hydraulic valve comprising:
   a first housing with at least two flow ports;
   a spool element disposed within the first housing and urged in a first direction by a first elastic element; and,
   a latching mechanism disposed within the first housing and urged in a second direction, opposite the first direction, by a second elastic element, wherein:
      for fluid pressure at a first level, the spool element is displaceable in the second direction to enable flow between the flow ports; and
      for fluid pressure at a second level, higher than the first level, the latching mechanism is displaceable in the first direction to latch or unlatch the latching mechanism, wherein:
   in an unlatched position of the latching mechanism, force from the second elastic element is transferred to the spool element to enable flow between the flow ports;
   in a latched position of the latching mechanism, the spool element is isolated from the second elastic element; and,
   the latching mechanism comprises:
      a tooth ring fixed to the first housing;
      a retainer disposed proximate the second elastic element; and,
      a plunger disposed proximate the spool element, and wherein the retainer and plunger are in mating engagement and each comprise a toothed portion for rotational engagement with the tooth ring.

9. The hydraulic valve of claim 8, wherein the retainer comprises a blocking portion, the retainer and plunger comprise complementary ramps in mating engagement, and wherein:
   the second level fluid pressure displaces the retainer toothed portion axially beyond the tooth ring;
   forces from the second elastic element and the fluid pressure acting on the complementary ramps rotate the retainer; and,
   the blocking portion engages the tooth ring after the rotation.

10. The hydraulic valve of claim 8, wherein the plunger is hydraulically sealed to the first housing.

11. The hydraulic valve of claim 8 further comprising a second housing, wherein the spool element is disposed in and hydraulically sealed to the second housing, and the second housing is disposed in and hydraulically sealed to the first housing.

12. The hydraulic valve of claim 11 further comprising a plug, wherein the second housing is fixedly attached to the plug and the plug is sealed to the first housing.

13. The hydraulic valve of claim 12 further comprising a first elastic element axially disposed between the spool element and the plug, wherein the spool element comprises an angled surface and the second housing comprises a ledge, and the first elastic element urges the angled surface into sealing contact with the ledge.

* * * * *